UNITED STATES PATENT OFFICE.

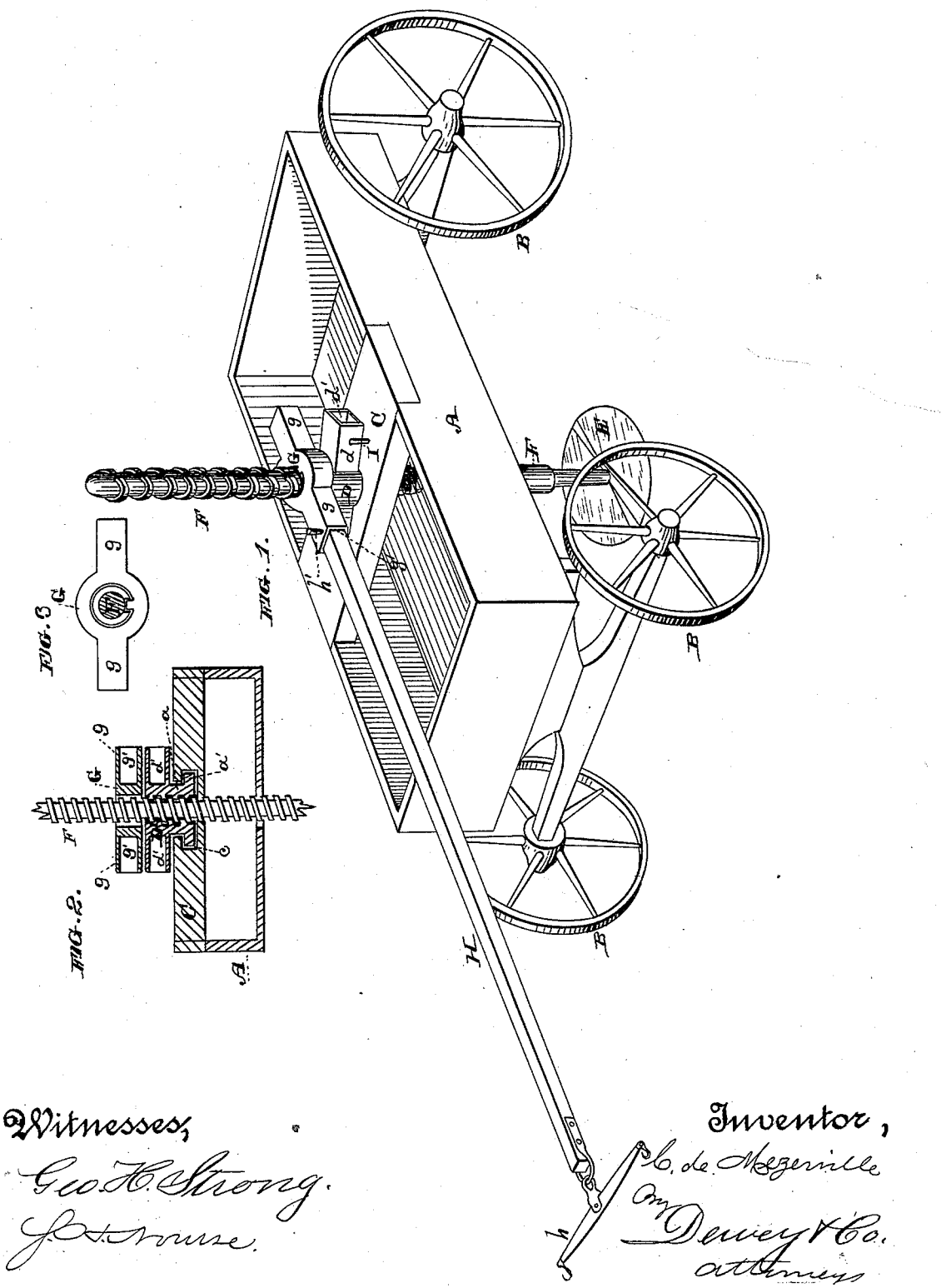

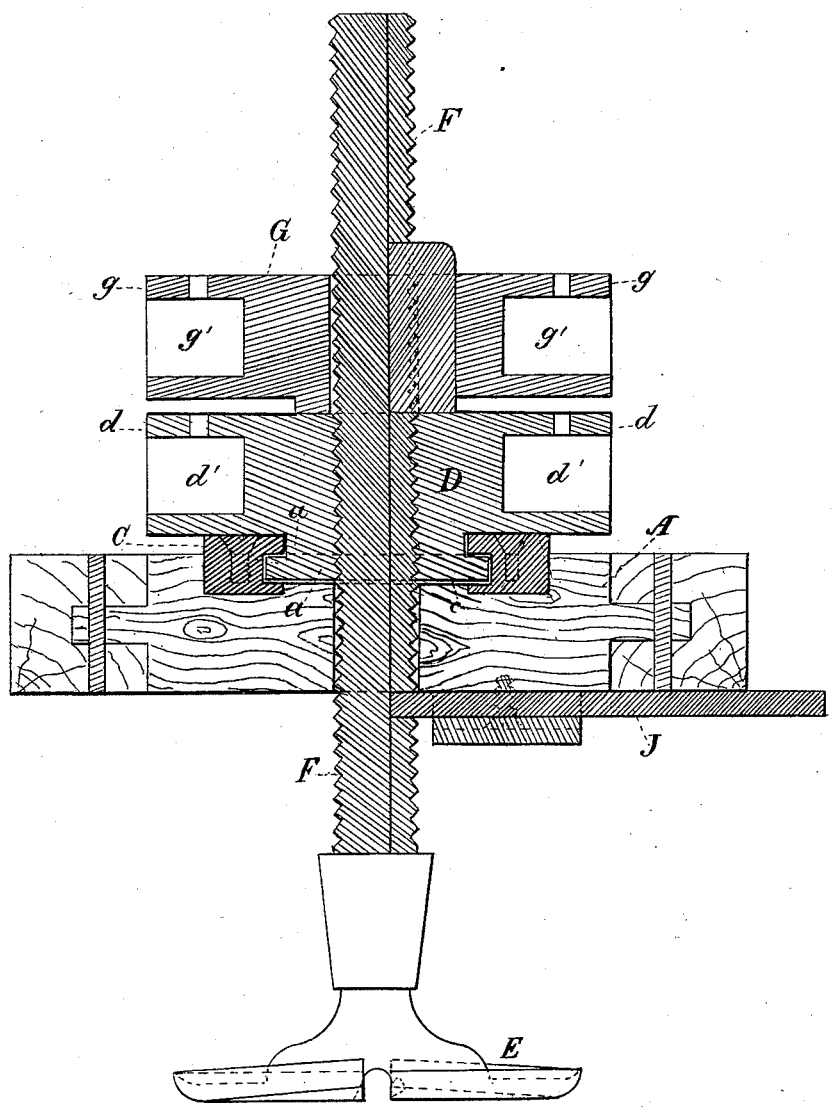

CAMILLE DE MÉZERVILLE, OF SANTA CLARA, CALIFORNIA.

EARTH-BORING AUGER.

SPECIFICATION forming part of Letters Patent No. 300,053, dated June 10, 1884.

Application filed September 17, 1883. (No model.)

*To all whom it may concern:*

Be it known that I, CAMILLE DE MÉZERVILLE, of Santa Clara, county of Santa Clara, and State of California, have invented an Improvement in Earth-Boring Augers; and I hereby declare the following to be a full, clear, and exact description thereof.

My invention relates to a new and useful device for boring holes in the earth for planting trees or posts; and it consists in a wheeled frame carrying the earth-auger, the shank of which is a screw, upon which are fitted a nut and a washer, each of which is adapted to receive a pole or lever for operating them to cause the insertion and withdrawal of the auger, the power being applied in a single direction, as I shall hereinafter fully explain.

The object of my invention is to provide easy means for operating the auger.

Referring to the accompanying drawings, Figure 1 is a perspective view of my invention. Fig. 2 is a section of the mechanism. Fig. 3 is a top view. Fig. 4 is a cross-section showing the engagement of the pin J.

A is the body of a vehicle, mounted on wheels B. Upon the center of the body A is a transverse plate, C, having in its center a flanged socket, c.

D is a nut having oppositely-extending arms d, provided with sockets d'. This nut has a downwardly-projecting neck, a, fitting through the top of socket c, and a flange, a', which lies within the socket, whereby said nut may turn freely, and yet cannot rise from its bearing.

E is the auger, and F its stem or shank, made in the form of a screw, as shown. This shank passes down through nut D and plate C. A washer, G, is feathered upon the screw-shank, and lies just above nut D. It has oppositely-projecting arms g, having sockets g'.

H is a lever or pole, having the single-tree h upon its end, whereby the horse may be attached to it.

The operation of my device is as follows: The inner end of pole H is inserted in one of the sockets g' of washer G, and the horse is made to travel in a direction required to turn the screw down through the nut D, which, being anchored, remains in the same plane, while the screw passes down through it, and its auger bores into the earth. To raise the auger remove the pole from washer G and insert it in one of the sockets d' of nut D, and continue to drive in the same direction. The screw now rises through the nut.

In order to prevent the nut D from turning when the washer G is being turned, I have a pin, I, which I insert in the plate C against an arm of the nut. When the nut is to be turned, I remove the pin; but in order to prevent the screw from turning when the nut D is being turned to raise said screw, I have a pin, J, mounted in guides j under the wheeled frame, and adapted to be pushed in to fit its end within the feather-groove of the screw, or to withdraw it therefrom. When fitted in said groove, it prevents the screw from turning, though it allows it to rise.

Having thus described my invention, what I claim as new, and desire to secure by Letters Patent, is—

1. The transverse bearing-plate C on the wheeled frame, and the auger E, having screw-shank F, in combination with the anchored rotating nut D, threaded on the screw-shank, the washer G, feathered on the screw-shank above the nut, and a means for alternately rotating said nut and washer to raise or depress the auger, respectively, substantially as herein described.

2. The wheeled frame A, having transverse plate C, with flanged socket c, and the auger E, having screw-shank F, in combination with the nut D on said screw-shank, and having socket-arms d and flanged neck a, fitting socket c, the washer G, feathered on said screw-shank and having socket-arms g, and the pole or lever H, adapted to fit its end into the socket-arms of the nut D or washer G, substantially as and for the purpose herein described.

3. The transverse bearing-plate C on the wheeled frame, and the auger E, having grooved screw-shank F, in combination with the rotating horizontally-anchored nut D, having socket-arms d, the pin I, for preventing its revolution, the feathered washer G on the screw-shank, and having socket-arms g, the sliding pin J, adapted to fit the feather-groove of the screw-shank to prevent it from turning, and the removable pole or lever H, substantially as and for the purpose herein described.

In witness whereof I have hereunto set my hand.

CAMILLE DE MÉZERVILLE.

Witnesses:
LOUIS C. W. OTTO,
GEO. McCRACKEN.